(12) United States Patent
Ohsawa

(10) Patent No.: US 7,301,264 B2
(45) Date of Patent: Nov. 27, 2007

(54) FRONT PLATE AND DISPLAY DEVICE USING SAME

(75) Inventor: Michitaka Ohsawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 11/048,168

(22) Filed: Jan. 31, 2005

(65) Prior Publication Data

US 2005/0190321 A1 Sep. 1, 2005

(30) Foreign Application Priority Data

Feb. 9, 2004 (JP) .............................. 2004-031504

(51) Int. Cl.
*G02F 1/1335* (2006.01)
*H01J 61/40* (2006.01)

(52) U.S. Cl. ..................... 313/110; 313/461; 313/478; 359/885; 349/105

(58) Field of Classification Search ........ 313/110–112; 359/34, 229

See application file for complete search history.

(56) References Cited

U.S. PATENT DOCUMENTS

| | | | | |
|---|---|---|---|---|
| 3,646,266 | A * | 2/1972 | Hassell ........................ | 348/832 |
| 6,278,237 | B1 * | 8/2001 | Campos ....................... | 313/512 |
| 6,419,366 | B1 * | 7/2002 | Namioka ..................... | 359/601 |
| 6,836,354 | B2 * | 12/2004 | Kato et al. ................... | 359/332 |
| 2003/0053207 | A1 * | 3/2003 | Ballen et al. ................ | 359/453 |
| 2004/0217681 | A1 * | 11/2004 | Park et al. ................... | 313/110 |
| 2005/0236949 | A1 * | 10/2005 | Hong et al. ................. | 313/110 |

FOREIGN PATENT DOCUMENTS

| | | |
|---|---|---|
| JP | 06-187924 | 7/1994 |
| JP | 06-194741 | 7/1994 |
| JP | 10-283939 | 10/1998 |
| JP | 2000-206932 | 7/2000 |
| JP | 2002-083548 | 3/2002 |
| JP | 2003-050307 | 2/2003 |

* cited by examiner

*Primary Examiner*—Ashok Patel
(74) *Attorney, Agent, or Firm*—Townsend and Townsend and Crew LLP

(57) ABSTRACT

Frusto-conical needle-shaped light guide paths are implanted on the surface of a display panel such that output light from display elements propagate through the needle-shaped light guide paths through total reflection, while external light repeats reflections multiple times on wedge-shaped surfaces of the light guide paths, and attenuates. A light absorbing film is coated on the surfaces of the needle-shaped light guide paths to increase a contrast ratio. Thus, a higher contrast can be accomplished in a bright room, and cross-talk between adjacent pixels is reduced. A reduction in contrast due to display light is also alleviated by employing longer implanted needle-shaped light guide paths, and bringing light incident surfaces of the needle-shaped light guide paths into close contact with the surface of the display panel.

20 Claims, 6 Drawing Sheets

FRONT PLATE AND DISPLAY DEVICE USING SAME

INCORPORATION BY REFERENCE

The present application claims priority from Japanese application JP2004-031504 filed on Feb. 9, 2004, the content of which is hereby incorporated by reference into this application.

BACKGROUND OF THE INVENTION

1. Field of the Invention

The present invention relates to a display device which mitigates reduced contrast (bright-room contrast) due to external light when a display screen is viewed in a bright room in order to reduce blurred images, and more particularly, to a front plate which is integrally or separately arranged on a front surface of the display device to improve the contrast of viewed images, and a display device using the same.

2. Description of the Related Art

Conventionally, for improving the contrast in a bright room (hereinafter called the "bright-room contrast") of a display device using a display panel having selfluminous pixels, arranged in matrix, which emit light in accordance with the Lambert distribution, the transmittance $\tau$ of a front plate arranged integrally or separately on a front surface of a display panel, such as a plasma display panel (hereinafter abbreviated as "PDP") or the like, for displaying an image is set in a range of approximately 35 to 70%, such that external light is attenuated while room light (hereinafter called the "external light") incident on the front plate is reflected back by an opposite surface of the front plate or the display panel (i.e., while the light goes to the front plate and back twice) to increase the ratio of output light from the display panel to the external light, thereby improving the contrast. Such a technique is disclosed, for example, in page 2, right column, paragraph number 0009 of JP-A-2000-206932.

Description will be made qualitatively with reference to a diagram shown in FIG. 10. In FIG. 10, output light B from a display panel 2 reduces its value to B×$\tau$ ($\tau$: transmittance) while it passes through a front plate 200. On the other hand, since external light b goes to and back from the front plate 200, the transmittance of which is $\tau$, its magnitude changes to b×$\tau$×$\tau$ during the reciprocal travel. When the transmittance $\tau$ is 0.5, the external light largely attenuates, and reduces to 0.25 times as high as when there is no front plate 200 for adjusting the transmittance. For this reason, a high contrast image can be viewed in a bright room.

Other means for improving the bright-room contrast include a technique for applying an anti-reflection film on an external light incident surface of the front plate 200 for preventing the external light from reflecting, a technique for forming miniature ruggedness to irregularly reflect external light, and the like. Either of them improves the bright-room contrast by preventing the glaring of external light. These techniques are disclosed, for example, in FIG. 4 of JP-A-2002-83548, JP-A-6-187924, JP-A-10-283939, and the like.

An anti-reflection film 210 in FIG. 10 prevents the glaring due to external light as mentioned above. The anti-reflection film 210 acts to largely reduce reflection of external light on the surface of the front plate 200. However, the external light which transmits the front plate 200 is reflected back from the opposite surface of the front plate 200 or the display panel, and exits from the front plate toward a viewer. In this event, if the external light transmitting the front plate 200 does not attenuate while it is reflected back, the external light reduces the bright-room contrast. Generally, the anti-reflection film is used in combination with an improving means for reducing the transmittance of the front plate, such that the external light transmitting the front plate is absorbed by the front plate with the transmittance $\tau$ to attenuate as mentioned above.

A further means for improving the contrast in a bright room involves forming an exit surface of a transmission type screen with conical protrusions, for example, circular truncated cones similar to wedge-shaped protrusions used on wall surfaces of an acoustic anechoic chamber, a radio anechoic chamber and the like for absorbing sound and radio waves without reflection, for example, as disclosed in JP-A-6-194741, JP-A-2003-50307, and the like.

Since the present invention is deeply related to JP-A-6-194741 and JP-A-2003-50307, reference is made to FIGS. 1 and 2 of JP-A-6-194741 for describing the foregoing technique in detail.

In FIGS. 1 and 2 of JP-A-6-194741, as external light 23 is incident on an inclined portions 14 of a convex protrusion 12, the external light 23 repeats reflections multiple times as shown (indicated by dotted lines) between adjacent inclined portions 14 to attenuate.

On the other hand, projected light 21 from the back of a screen propagates within the convex protrusions 12 nearly in a total reflection condition, and is outputted from a peak 13 with less attenuation. Specifically, the reflection of the external light 23 can be reduced while maintaining the projected light 21 from the back of the screen at substantially consistent brightness without largely attenuating the projected light 21, so that the bright-room contrast can be satisfactorily improved.

In addition, the inclined portions 14 may be coated with a light absorption layer 15 or the like to absorb reflected light, resulting in a higher contrast ratio.

As described above, the technique using the convex protrusions demonstrates significant effects for improving the contrast of images in a bright room.

SUMMARY OF THE INVENTION

However, the prior art improving means for reducing the transmittance to improve the bright-room contrast has a problem of reducing the output light by the transmittance $\tau$ as well, so that the exit light must be previously increased. In some cases, difficulties are encountered in combining the prior art technique with a display panel which originally has a low output luminance or a display which has a low light output efficiency.

In regard to CRT, a material for adjusting the transmittance is generally mixed in a glass raw material of a face plate, equivalent to a front plate, to adjust the transmittance. On the other hand, in regard to PDP, a front plate which is charged with a number of roles such as an unwanted irradiation reduction effect, a color temperature adjustment function, an infrared ray reduction effect, a panel glass protection function, and the like other than the transmittance adjustment, is mounted on a display panel glass of PDP, and PDPs equipped with such a front plate have been available on the market. In either case, there is no difference in the function of improving the bright-room contrast by adjusting the transmittance, but a common problem still remains unsolved in regard to the attenuation of even emitted light from light emitting elements.

On the other hand, it is said that the improving means for improving the bright-room contrast using miniature ruggedness on an external light incident surface of a front plate irregularly reflects external light to make an image glared on the panel ambiguous, thus reducing the tiredness of the viewer. Nevertheless, part of reflected external light returns toward the viewer, so that this improving means hardly contributes to a reduction in the bright-room contrast.

To solve the foregoing problems, consider that the convex protrusions disclosed in the aforementioned JP-A-6-194741, JP-A-2003-50307 or the like is applied to a front plate of a display device. An optical plate using the convex protrusions can produce effects when light of image incident on the plate is near parallel light, and has been devised on the assumption that it would be applied to a transmission type screen of a projection type display. However, the application of this technique to a display device gives rise to some concerns as mentioned below.

FIG. 11 shows an example which employs an optical plate formed with the aforementioned convex protrusions as a front plate. As shown in FIG. 11, when an optical plate formed with protrusions 110' is adhered, through an adhesive layer 3, to a display surface of a selfluminous display panel 2 which emits light in a pattern in accordance with the Lambert distribution, for example, PDP, a field emission display (hereinafter abbreviated as "FED") or the like, light emitted from display pixels 400 of the PDP or FED impinges on adjacent protrusions formed on adjacent display pixels 401 as leak light 500, due to its lack of the directivity (Lambert distribution), or light impinging on a flat portion 150 repeats reflections multiple times to produce stray light 501, resulting in a blurred image and a lower contrast, as described below.

The problem associated with the optical plate formed with convex protrusions, disclosed in the aforementioned JP-A-6-194741 or JP-A-2003-50307, will be described in a specific manner with reference to FIG. 11.

As shown in FIG. 11, when the protrusions 110' are formed, a reduced amount of light is incident on the protrusions 110' which function to be light guide paths. Light which cannot be incident on the protrusions 110' changes into stray light 501, so that the display light itself degrades the contrast of a displayed image to cause a lower image quality (blur).

Further, even when the incident portion (a bottom portion of the protrusion) is shaped into a base of a prism to eliminate a flat portion, for example, as can be seen in FIG. 5 of the aforementioned JP-A-6-194741, disturbance occurs in trapping of light into the protrusions 110' to produce optical cross-talk unless incident light is a light near parallel light having the directivity. Also, while the foregoing shape includes the incident portion in a prism shape and an exit portion in a conical shape to make a smooth connection, light reflects in a rather complicated manner, so that when non-directional light or broadly directional light is incident on the protrusions 110', light loss is produced due to disturbance in the condition such as total reflection. This adversely affects the image quality.

The problems of a lower image quality due to stray light, optical cross-talk, light loss and the like are attributable to non-directional light (including broadly directional light) which is handled in a structure in which a light incident portion of each protrusion 110' is remote from a light emission source. In particular, in the aforementioned JP-A-6-194741 or JP-A-2003-50307, for example, the influence is significant because of a large thickness of a sheet, which serves to be a matrix, due to limitations related to the manufacturing process. Inherently, those shown in the foregoing documents are effective to directional light such as parallel light, and was though as a technique for improving a transmission type screen of a projection type display which handles directional light, so that the production of stray light due to disturbance in the trapping of light into the protrusion, light loss, increased cross-talk, and the like are enormous challenges for non-directional light such as display light of PDP and FED.

While the aforementioned JP-6-194741 or JP-A-2003-50307 also refers to a specific method of fabricating the sheet, but proposed therein is a roll-based transfer from the ease of manufacturing. The roll-based transfer, though suitable for mass production and cost reduction, is not proper for forming deep grooves. As such, the proposed method involves difficulties when it is applied to improve the performance by solving such challenges as a lower image quality due to produced stray light, optical cross-talk, light loss, and the like.

Further, as shown in FIG. 11, when there is a large distance (indicated by t1) between a light trapping side of the protrusion 110' and the display pixel 400 which serves as a light source, a small amount of light will be merely trapped unless the protrusion 110' has a light trapping surface of a large radius r. However, if the radius r is increased, a larger amount of light leaks into the light trapping surface of a pixel from adjacent pixels, though increased amount of light can be trapped, resulting in increased cross-talk, degraded image quality, and lower resolution. For preventing a lower resolution and reducing the cross-talk, the radius r of the base of the protrusion must be sufficiently small relative to the size of the display pixel, and simultaneously, the distance t1 must be small from the light source to the light trapping aperture (incident surface of the protrusion).

Also, the manufacturing method shown in the aforementioned JP-A-6-194741 or JP-2003-50307 experiences difficulties in the formation of an anti-reflection film coated for preventing reflection, and in particular, in the formation of the anti-reflection film on an inclined surface without filling, when a deep groove is required, though it is effective for a shallow groove (small t2).

The present invention presents a resolution in view of the circumstance mentioned above.

To solve the foregoing problems, the present invention provides an anti-glare front plate, which may be integrated to or separately disposed on a front surface of a display panel having a plurality of pixels for preventing external light from reflecting. The front plate includes a plurality of protrusions each having a cross-sectional area which tapers gradually in a direction in which light from the display panel travels along the protrusion, wherein a plurality of the protrusions are included in a region corresponding to a unit pixel area of the display panel. The protrusions are optically transparent frustum-shaped fibrous protrusions which are optically implanted on the surface of the display panel.

According to the present invention, the image quality can be improved.

Other objects, features and advantages of the invention will become apparent from the following description of the embodiments of the invention taken in conjunction with the accompanying drawings.

DETAILED DESCRIPTION OF THE EMBODIMENT

Figure 1:
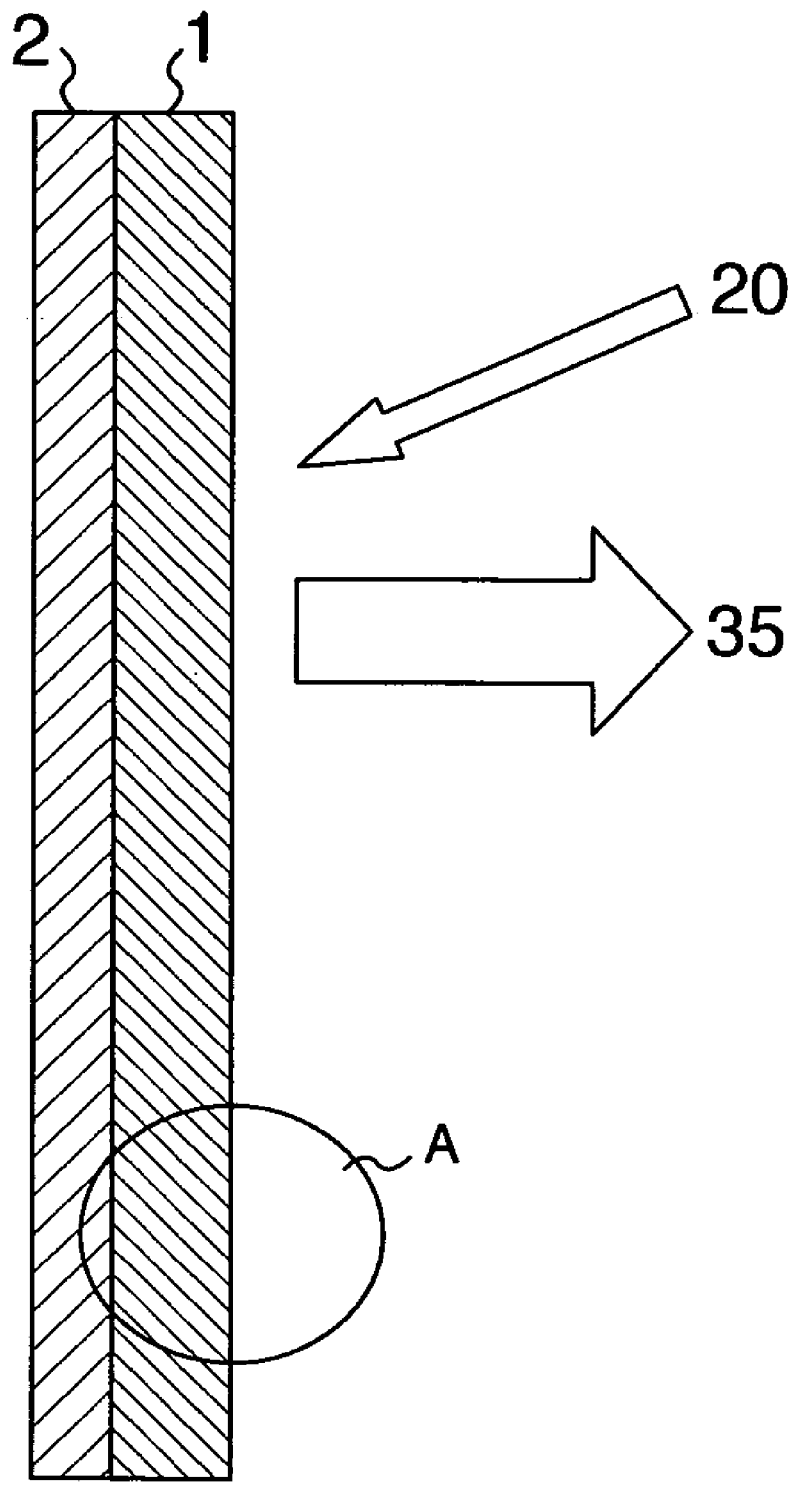
FIG. 1 is a schematic diagram generally showing a front plate according to the present invention.

This application claims the benefit of priority of Japanese Patent Application No. 2004-31504 filed Dec. 9, 2004, the disclosure of which also is entirely incorporated herein by reference.

In the following, the present invention will be described in detail with reference to the accompanying drawings. In the respective figures, parts having common functions are designated the same reference numerals, and repeated description will be omitted for parts once described.

The present invention is intended to improve a bright-room contrast, and prevent a degraded image quality and lower contrast due to cross-talk among pixels and stray light produced when exit light from a display device does not have directivity or has broad directive characteristics, by applying the nature of light, i.e., "the amount of light attenuation is large in multiple reflections of light but is small in total reflection," bringing a front plate formed by bundling filiform fibers having a frustum-shaped tapered needle-like protrusive shape near a display panel of a display device into close contact with the front surface of the display panel, such that the filiform fibers are implanted on the display panel surface.

FIG. 1 is a vertical sectional view generally showing the structure of a front plate in a thickness direction according to one embodiment of the present invention.

In FIG. 1, the front plate according to the present invention comprises a needle-shaped optical sheet 1 having miniature tapered frustum-shaped protrusions implanted thereon with their protrusions facing to exit light 35. The needle-shaped optical sheet 1 is adhered to the front surface of a display panel 2 of a display device with an optically transparent adhesive layer 3.

A display device comprises selfluminous pixels, arranged in matrix, which emit light in a pattern in accordance with the Lambert distribution, and display panels may include, for example, CRT, PDP, FED, LED panel having LED (Light Emitting Diode) arranged in matrix, EL panel having EL (Electroluminescence) arranged in matrix, and the like.

As described later, in the present invention, external light 20 is attenuated by the aforementioned miniature frustum-shaped protrusions, thus making it possible to reduce the glaring into the display device or display panel and improve the bright-room contrast, and the protrusions have a unique shape in order to reduce cross-talk among display pixels which serve as light sources. In FIG. 1, the exit light 35 is video light emitted from a display panel 2. Also, it goes without saying that the display panel 2 and needle-shaped optical sheet 1 have refractive indexes larger than that of air.

Figure 2:
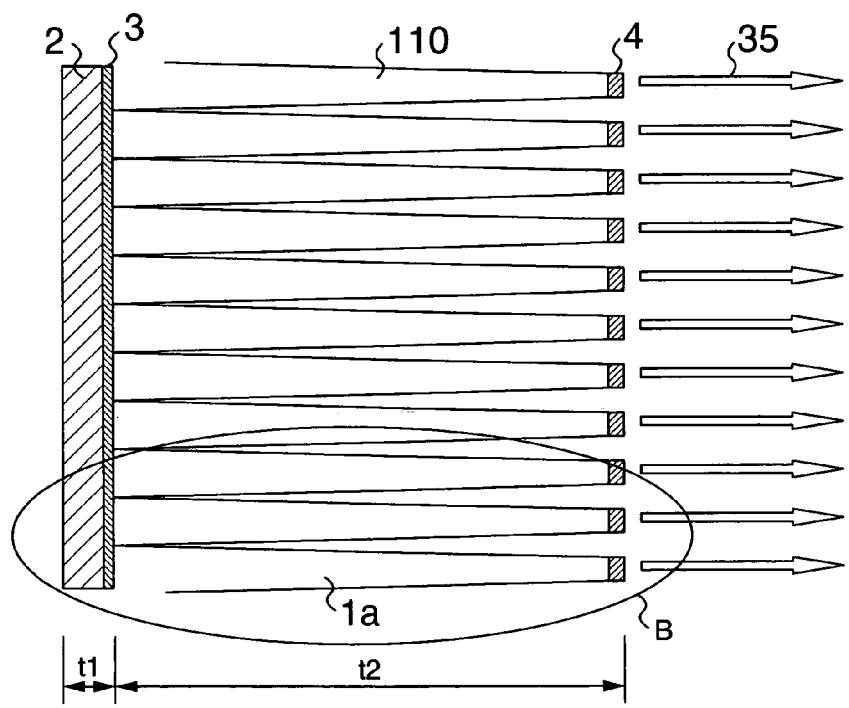
FIG. 2 is a schematic diagram generally showing a needle-shaped optical sheet which is a front plate according to a first embodiment.
Figure 3:
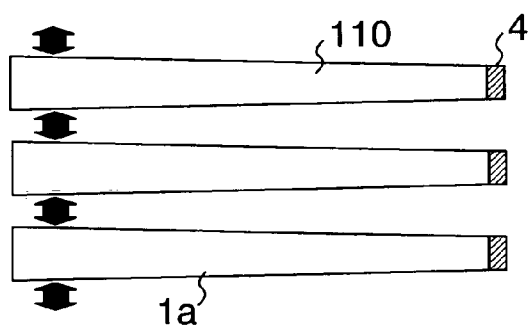
FIG. 3 is a diagram for explaining the fixation of individual elements of the needle-shaped optical sheet.
Figure 4:
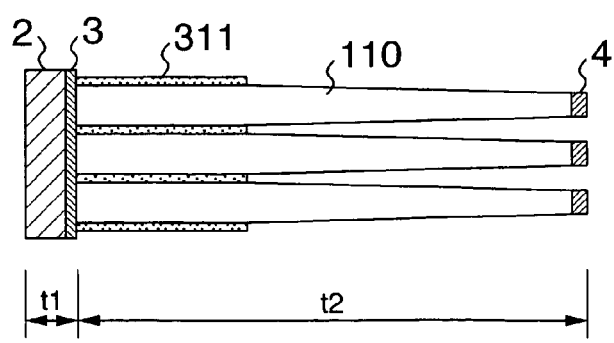
FIG. 4 is an enlarged view showing t needle-shaped light guide paths and their surroundings in the first embodiment.

FIG. 2 is a schematic diagram generally showing, in an enlarged view, a portion A of the needle-shaped optical sheet in FIG. 1, which is the front plate according to a first embodiment. FIG. 3 shows frustum-shaped protrusions which are individual elements of the needle-shaped optical sheet, depicting that they are bundled at the roots. FIG. 4 is an enlarged schematic diagram of a portion B in FIG. 2. This embodiment employs, as the frustum-shaped protrusions, tapered frusto-conical fibers 1a, the diameter of which is different at both ends thereof. The tapered frusto-conical fibers 1a are bundled together.

In FIGS. 2, 3, 4, the frusto-conical fibers 1a are used as needle-shaped light guide paths 110 for guiding light from the display panel 2. The end faces having a larger diameter (thickness) of the frusto-conical fibers 1a are fixed by a black adhesive layer 311 or the like near the display panel 2, and implanted on the display panel 2 through a transparent adhesive layer 3 to make the frusto-conical fibers into a sheet shape. In this event, a transparent sheet (not shown), which is a very thin base, is used together with the adhesive layer 3 to fix the needle-shaped light guide paths 110 on the transparent sheet, and the transparent sheet with the needle-shaped light guide paths 110 (i.e., frusto-conical fibers 1a) fixed thereon may be adhered to the display surface of the display panel 2 through the adhesive layer 3. Also, a diffusion surface 4 may be provided on the exit surface of the frusto-conical fibers 1a for diffusing light to control an exit distribution of exit light 35.

By thus fabricating the front plate, it is possible to simultaneously provide both effects of reduced cross-talk among pixels, and improved cross-talk even for display devices which do not the directivity or have a broad directivity, as PDP.

It should be understood that when the diameter (thickness) of the needle-shaped light guide paths 110 is sufficiently smaller than the unit pixels of the display panel 2 (substantially one fifth or less), a problem associated with sampling is also mitigated, so that the needle-shaped light guide paths 110 function in an effective manner.

Figure 5:
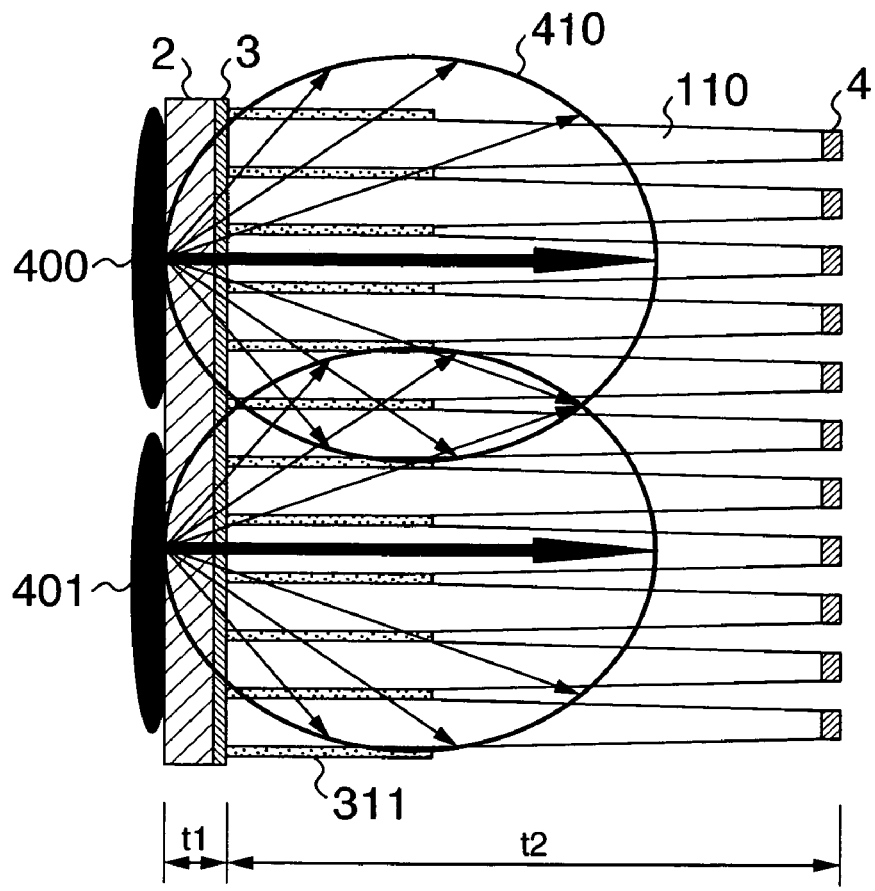
FIG. 5 is a diagram for explaining the principle of reducing cross-talk among pixels.
Figure 6:
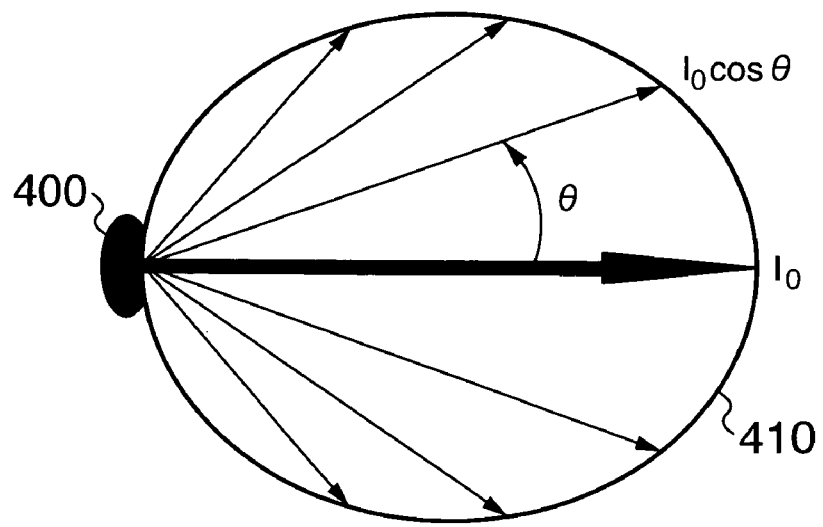
FIG. 6 is a diagram showing a distribution pattern of light outputted from a pixel.

Here, description will be made on the principle of reducing cross-talk among pixels, which is the essence of the present invention. FIG. 5 is a diagram for explaining the principle, showing a distribution of light emitted from light sources (light generation points) which are pixels on a display panel. A distribution 410 of light emitted from pixels 400, 401 of a PDP employed for explanation in this example is called the "Lambert distribution," which is extracted and shown in FIG. 6. In FIG. 6, the intensity of light in a direction of angle $\theta$ is expressed by $I_0 \cos \theta$, where $I_0$ is the intensity of the light at the center. With this distribution, an image can be viewed over a fairy wide range on PDP, FED, CRT and the like.

Figure 11:
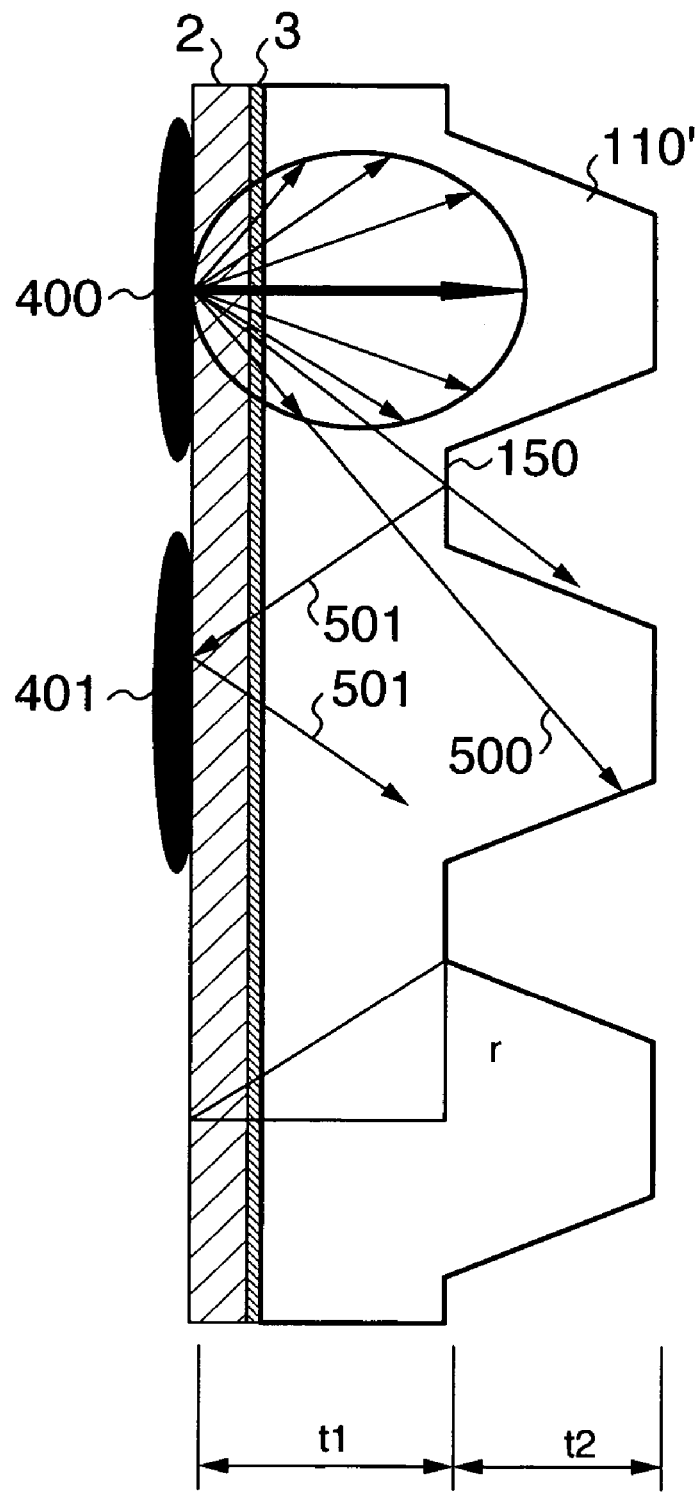
FIG. 11 is a diagram for explaining the function of another conventional front plate.

In this embodiment, as shown in FIG. 5, the distance t1 from the light source, which is a display pixel (for example 400), to a light trapping aperture (incident surface of the protrusion) is smaller than that in the conventional front plate shown in FIG. 11, resulting in a reduction in the amount of light leaking from adjacent pixels (for example 401) on the base of the needle-shaped light guiding path. Also, a single area of the display pixel 400 includes a plurality of needle-shaped light guide paths, and there is the black adhesive layer 311 at the roots of the needle-shaped light guide paths, so that adjacent light incident on the roots of the needle-shaped light guide paths within the area of the display pixel 400 from the adjacent display pixel 401 is absorbed and shielded by the black adhesive layers of the plurality of needle-shaped light guide paths included in the area of the display pixel 400, thus reducing the amount of light leaking from this part. For example, as shown in FIG. 5, t1 may be one half to one fifth or less shorter than t2. It is therefore possible to reduce the amount of leaking from adjacent pixels, i.e., cross-talk among pixels. Further, since there is no portion equivalent to the flat portion 150 of the conventional front plate in FIG. 11, it is also possible to reduce stray light caused by the flat portion 150. In other words, it is possible to reduce a degraded image quality, and lower contrast.

Also, as the diameter of the frusto-conical fibers, which serve as the needle-shaped light guide paths, is chosen to be sufficiently smaller relative to the display pixels (for example, ⅕ or less), the degraded image quality and lower contrast can be more fully ignored, restrictions are alleviated for an array when the frusto-conical fibers are bundled, and the like, thereby facilitating the manufacturing.

Figure 7:
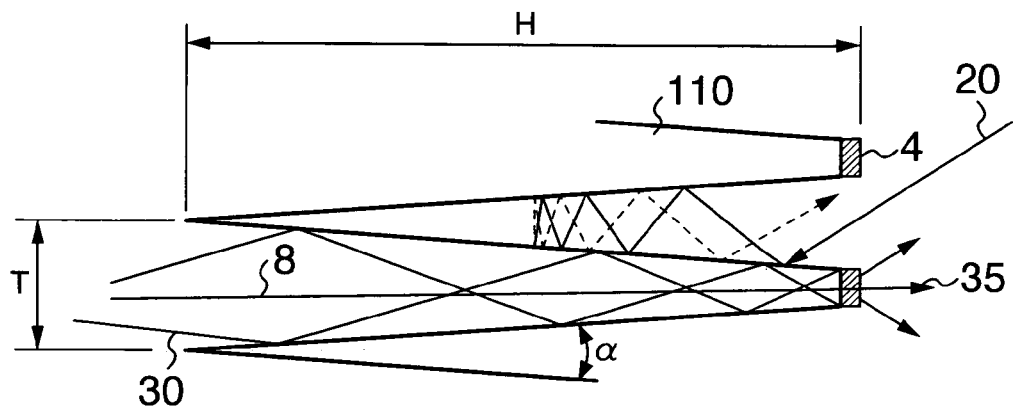
FIG. 7 is an enlarged view showing in detail needle-shaped light guide paths in the first embodiment.

FIG. 7 is an enlarged view showing a portion of the needle-shaped light guide path 110 in FIG. 5 in greater detail, for explaining the operation of the needle-shaped light guide path 110. In FIG. 7, the needle-shaped light guide path 110 forms a frusto-conical space, where the cross-sectional area orthogonal to a main optical axis 8 of incident light 30 directed into the needle-shaped light guide path 110 from the display panel becomes gradually smaller in a direction in which incident light propagates. The incident light 30 incident on the needle-shaped light guide path 110 repeats total reflections, as shown, on the interface with air to propagate through the frusto-conical space within the needle-shaped light guide path 110, without suffering from large attenuation, and is diffused from a diffusion surface 4 and emitted as an exit light 35.

The cross-sectional area orthogonal to the main optical axis 8 of the needle-shaped light guide path 110 is sufficiently small as compared with a unit pixel area of the display panel. Therefore, if there were not the diffusion surface 4 on the exit surface of the needle-shaped light guide path 110, output light 35 would be light substantially parallel with the main optical axis 8. For this reason, the output light 35 must be diffused on the diffusion surface 4.

On the other hand, the external light 20 reflects multiple times as shown between the surfaces of the two needle-shaped light guide paths 110 having a refractive index larger than air (i.e., a concave groove 7 formed between the needle-shaped light guide path 110 and the adjacent needle-shaped light guide path 110), and attenuates because a reflection coefficient is multiplied each time it is reflected. The degree of attenuation is significant, and described below in a specific manner.

The luminance of the external light 20, after reflected $n$ times, is expressed by Equation 1 below:

$$b \times (k)^n \qquad \text{(Equation 1)}$$

where $b$ is the luminance of the external light 20, k is the surface reflectivity of the needle-shaped light guide path 110 (k<1), and $n$ is the number of reflections.

Here, if the aspect ratio (H/T), which is the ratio of the height H to the width T of the needle-shaped light guide path 110, is sufficiently large, an angle α formed by the concave groove 7 becomes smaller, so that even if the external light 20 is incident on the surface of the needle-shaped light guide path 110, for example, at a large incident angle, the incident angle become gradually smaller, causing the number of reflections to increase. Then, the external light 20 reverses its direction in the middle and returns to the viewer, but since the external light 20 has been sufficiently attenuated during the reflections, the bright-room contrast can be improved as compared with before.

In this embodiment, since the frusto-conical fibers for use as the needle-shaped light guide paths 110 have the diameter (thickness) sufficiently smaller (⅕ or less) than the unit display pixel area of the display panel, and a sufficiently large aspect ratio (H/T), the external light 20 can be sufficiently attenuated, thereby improving the bright-room contrast as compared with before.

In this embodiment, rather than a method of forming protrusions on a conventional transparent sheet through press working, the optical transparent frusto-conical fibers are bundled (fixed) at the proximal ends for formation into a sheet shape, so that the depth of the groove corresponding to the depth of the press working can be set in any way so as to accomplish an optically ideal condition, thus achieving the foregoing effects.

Further, since the diffusion surface 4 has an optical function for diffusing the exit light in accordance with a particular purpose, the exit surface may be roughen in miniature to scatter light in the most simple scenario. Also, for controlling the amount of diffusion, the exit surface may be formed into a micro-prism or a lens. In essence, depending on a viewing angle required as a display device, a various optical means may be applied, as a matter of course. It should be understood that the diffusion surface 4 need not be provided when the front plate is used in an application which requires a narrowed viewing angle to provide a high luminance in a particular region. Also, for matching the direction in which the light is emitted, the shape can be optically designed as well.

In this way, a large ratio is ensured for the exit light from the front plate disposed on the front surface of the display panel with respect to external light incident on the front plate and returning to the viewer, thus providing images having a high bright-room contrast even in a bright room.

As described above, according to the foregoing embodiment, since reflected external light can be reduced while maintaining exit light from the display panel of the display device substantially at a consistent brightness without the need for reducing the transmittance for attenuation, the bright-room contrast can be largely improved. It is also possible to simultaneously solve degraded (blurred) images and lower contrast due to cross-talk among pixels and stray light, thus generating images with a high sharpness and contrast.

Figure 8:
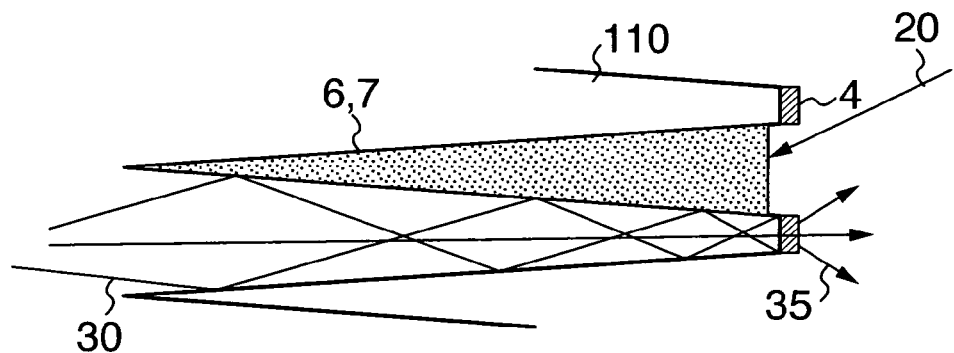
FIG. 8 is a diagram showing needle-shaped light guide paths of a front plate according to a second embodiment.

FIG. 8 shows needle-shaped light guide paths of a front plate according to a second embodiment. The second embodiment differs from the first embodiment in that an wedge-shaped space between adjacent needle-shaped light guide paths, i.e., a concave groove 7 is filled with a light absorbent 6 for absorbing external light.

In FIG. 8, the concave groove 7 between implanted needle-shaped light guide paths 110 is filled, for example, with a black light absorbent 6 for absorbing light, such that external light 20 can be absorbed by the light absorbent 6, thereby making it possible to further improve the bright-room contrast.

In addition, when the black light absorbent 6 is made of a conductive material (for example, carbon or the like) and is connected to a ground potential, the light absorbent 6 can be used also as a shield for reducing noise such as unwanted radiations.

Figure 9:
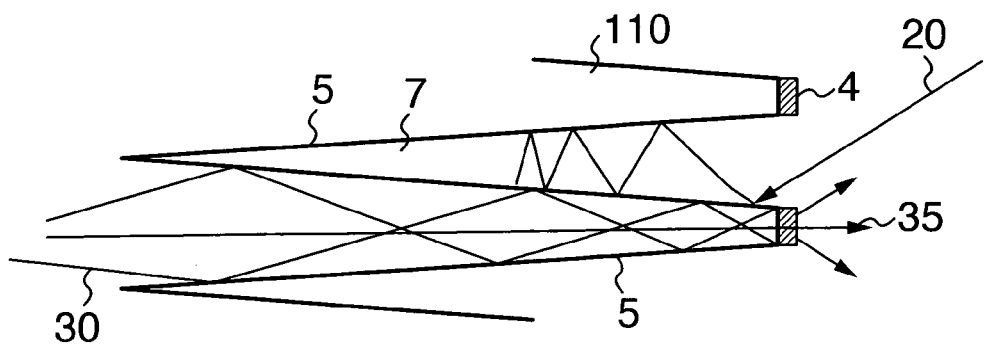
FIG. 9 is a diagram showing needle-shaped light guide paths of a front plate according to a third embodiment.
Figure 10:
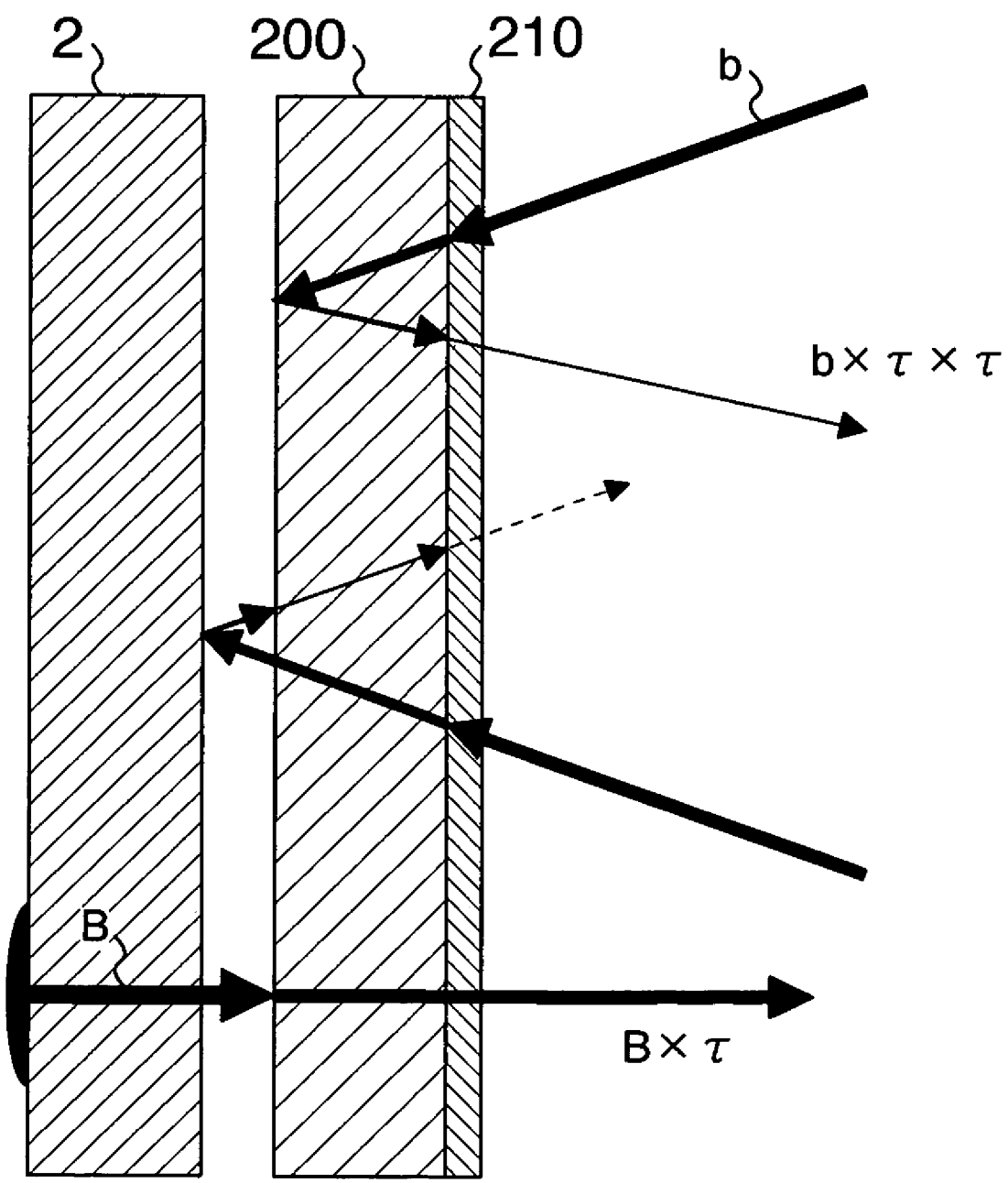
FIG. 10 is a diagram for explaining the function of a conventional front plate.

FIG. 9 shows needle-shaped light guide paths of a front plate according to a third embodiment. As illustrated in FIG. 9, unlike FIG. 8, the concave groove 7 is not filled with the light absorbent 6, but instead, a light absorbing film 5 for absorbing light is disposed to cover the surface of the needle-shaped light guide paths 110, except for the diffusion surface 4 at the leading end of the protrusion, thereby reducing the reflectivity.

External light 20 incident into the concave groove 7 is absorbed by the light absorbing film 5 formed on the surface of the needle-shaped light guide paths 110 and attenuated, as shown in FIG. 9, as it repeats reflections. In this way, the bright-room contrast is further improved as compared with the first embodiment.

In this embodiment, when the frusto-conical fibers undergo surface processing, before they are bundled, for bundling them, optical processing can be implemented irrespective of the manufacturing method, thus increasing the degree of freedom in setting the optical characteristics. For example, the light absorption film and the like described in the embodiment can be readily formed.

The embodiments have been described above on the assumption that the needle-shaped light guide paths have a high transmittance and do not attenuate exit light from the display panel. It should be understood, however, that the present invention, is not limited to such needle-shaped light guide paths, but a variety of optical characteristics can be further provided by reducing the transmittance.

As described above, according to the present invention, the bright-room contrast can be largely improved because reflected external light can be reduced while exit light from a display panel is maintained at a consistent brightness. It is further possible to reduce blurred images (degraded image quality) and lower contrast due to cross-talk among pixels and stray light, thereby accomplishing highly sharp and high contrast images.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A front plate disposed on a front surface of a display panel having a plurality of pixels, the front plate comprising:
a plurality of protrusions each having a cross-sectional area which tapers gradually in a direction in which light from said display panel travels along said protrusion, a plurality of said protrusions being included in a region corresponding to a unit pixel area of said display panel, wherein said protrusions are frustum-shaped protrusions for attenuating light from the outside, and
a light absorbent disposed between a plurality of said protrusions.

2. A display device comprising:
a display panel having a plurality of pixels; and
the front plate according to claim 1 disposed on a front surface of said display panel.

3. A front plate according to claim 1, wherein said light absorbent is conductive.

4. A front plate according to claim 1, wherein said frustum-shaped protrusions are optically transparent fibrous protrusions, wherein said front plate is mounted on the surface of said display panel such that said fibrous protrusions are implanted on the surface of said display panel.

5. A front plate according to claim 4, wherein said light absorbent is disposed between adjacent ones of said fibrous protrusions.

6. A front plate according to claim 5, wherein each said fibrous protrusion comprises a scattering surface on the protruding surface thereof for scattering light.

7. A front plate according to claim 4, wherein said light absorbent is disposed to cover a surface of each said fibrous protrusion except for a surface at a distal end of each said fibrous protrusion.

8. A front plate according to claim 4, wherein each said fibrous protrusion comprises a scattering surface on the protruding surface thereof for scattering light.

9. A display device comprising:
a display panel having a plurality of pixels; and
the front plate according to claim 4 disposed on a front surface of said display panel.

10. A front plate according to claim 4, wherein said fibrous protrusions are fixed together at the roots on said display panel with a black adhesive, wherein said light absorbent comprises said black adhesive.

11. A front plate according to claim 10, wherein said light absorbent is disposed between adjacent ones of said fibrous protrusions.

12. A front plate according to claim 11, wherein each said fibrous protrusion comprises a scattering surface on the protruding surface thereof for scattering light.

13. A front plate according to claim 10, wherein said light absorbent is disposed to cover a surface of each said fibrous protrusion except for a surface at a distal end of each said fibrous protrusion.

14. A front plate according to claim 10, wherein each said fibrous protrusion comprises a scattering surface on the protruding surface thereof for scattering light.

15. A display device comprising:
a display panel having a plurality of pixels; and
the front plate according to claim 10 disposed on a front surface of said display panel.

16. A front plate according to claim 10, wherein said fibrous protrusions are implanted and integrally formed into a sheet as a whole, and said sheet is adhered onto said display panel through an adhesive layer.

17. A front plate according to claim 16, wherein said light absorbent is disposed between adjacent ones of said fibrous protrusions.

18. A front plate according to claim 16, wherein said light absorbent is disposed to cover a surface of each said fibrous protrusion except for a surface at a distal end of each said fibrous protrusion.

19. A front plate according to claim 16, wherein each said fibrous protrusion comprises a scattering surface on the protruding surface thereof for scattering light.

20. A display device comprising:
a display panel having a plurality of pixels; and
a front plate disposed on a front surface of said display panel, wherein the front plate comprises:
a plurality of protrusions each having a cross-sectional area which tapers gradually in a direction in which light from said display panel travels along said protrusion, a plurality of said protrusions being included in a region corresponding to a unit pixel area of said display panel, and
a light absorbent disposed between a plurality of said protrusions.

* * * * *